R. Gipson,
Wringer,
Nº 44,796. Patented Oct. 25, 1864.
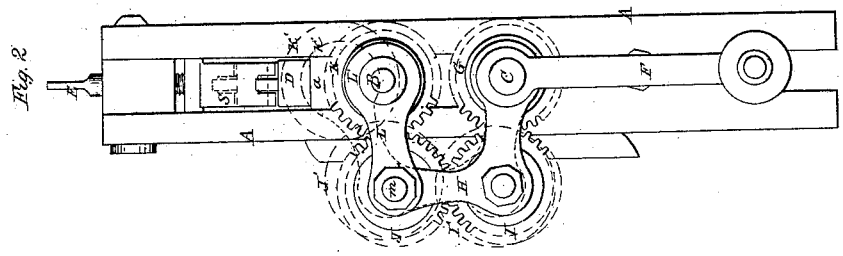
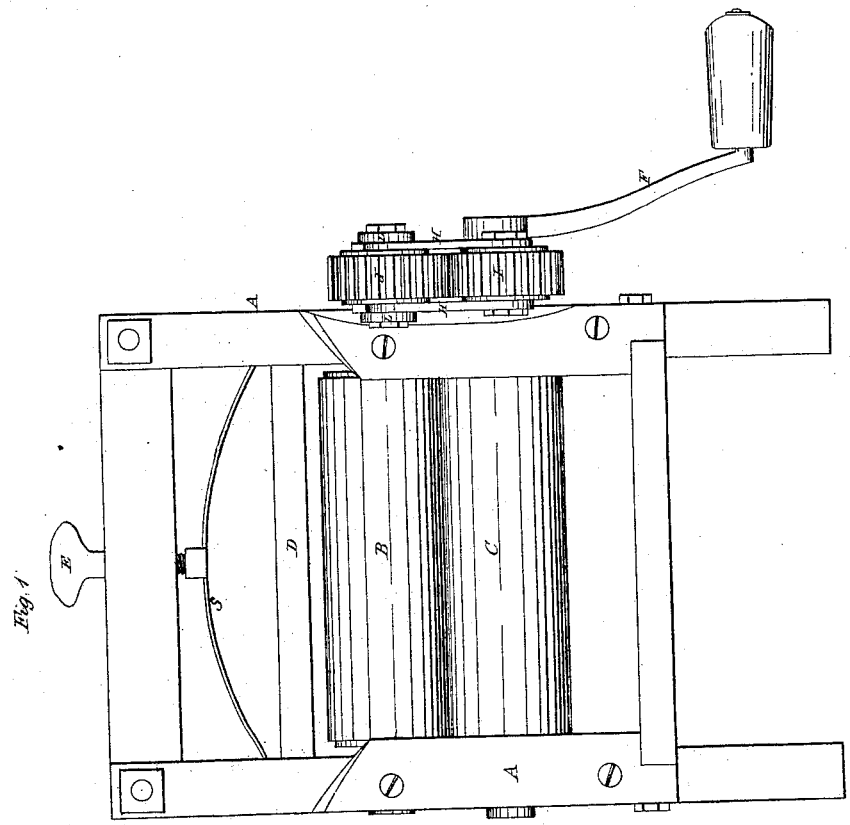

UNITED STATES PATENT OFFICE.

REUBEN GIPSON, OF SHELBY, OHIO.

IMPROVED CLOTHES-WRINGER.

Specification forming part of Letters Patent No. 44,796, dated October 25, 1864.

*To all whom it may concern:*

Be it known that I, R. GIPSON, of Shelby, in the county of Richland and State of Ohio, have invented certain new and useful Improvements in Clothes-Wringers; and I do hereby declare that the following is a full and complete description of the construction and operation of the same, reference being had to the accompanying drawings, making a part of this specification, in which—

Figure 1 is a front view of the wringer, of which Fig. 2 is an end view.

Like letters of reference denote like parts in the two views.

My improvement relates to a clothes-wringer, in which the rollers are turned by means of compensating-gearing in such a manner as to relieve the strain upon the rollers, so that the rubber rolls will not strip or turn upon the shafts.

In the figures, A is the frame of the wringer; B and C, the rollers, the shafts of which rest and turn in the slots of the frame with guides or boxes *a* above them and the piece D across, on which rests the spring S, that adjusts the pressure upon the rollers by means of the thumb-screw E.

On the end of the shaft of the lower roller, C, to which the crank F is connected, is secured a gear, G. (Seen in Fig. 2.) On each side of this gear, and adjustable on the shaft, are rectangular arms H H, that support intermediate gears, I and J. At the upper end of these arms, on the spindle or shaft *m* of the gear J, are the arms L L, that form a joint in connection with the arms H H. The other ends of the arms L L are hung upon the shaft of the roller B, on each side of the gear K, which is secured to the shaft. The gear K works in the intermediate gear J, and the gear G on the lower shaft in the intermediate gear I, and as the gears I and J work in each other the gears are all so connected that they will operate one another by the revolution of the crank-shaft turning both the rollers B and C; and from the manner of their connection they are perfectly adjustable to any position of the rollers, and can in no way be put out of gear as their position is changed, for, as the roller B is elevated by pressure between the rollers and the gear K raised up, as indicated by the dotted lines K' in Fig. 2, the end L' of the arms L moving in a vertical direction, and as the other end is on the shaft of the gear J, the gear J must be raised and drawn toward the gear K, as indicated by the dotted line J', the arms L L being adjustable on both shafts. This position of the upper gears raises the gear I, as indicated at I', the arms H H being adjusted accordingly upon the crank shaft. Thus the gears are all kept in the same relative position in contact with each other, as the gear K is raised more or less by pressure between the rollers, operating with the same facility in every position to which they may be adjusted by the action of the rollers.

In all wringers without gearing one of the rollers is turned by the crank and the other entirely by friction. The tendency of this is, that where used much, and in passing large materials between the rollers, the pressure is so great that the roller which is not turned by the crank will remain stationary, and consequently the strain will be so great upon the crank-roller that the rubber will be loosened or stripped from the shaft, whereas if both the rollers were turned by the direct action of the crank the rollers would be relieved from this undue strain and remove the liability of the rolls stripping or turning upon the shaft.

I am aware that intermediate compensating-gear has long been in common use in planing-machines, carding-machines, grain-drills, and similar mechanism, and that the same has also been used in combination with the rollers of a clothes-wringer, as shown in the patent of C. H. Packard, September 8, 1863, and therefore I do not claim either of them; but

What I claim as my improvement, and desire to secure by Letters Patent, is—

The adjustable arms H H and L L and gears G I J K, in combination with the rollers B and C, when operating conjointly, as and for the purpose substantially as set forth.

REUBEN GIPSON.

Witnesses:
W. H. BURRIDGE,
A. W. McCLELLAND.